US007561965B1

(12) United States Patent
Nesbitt et al.

(10) Patent No.: US 7,561,965 B1
(45) Date of Patent: Jul. 14, 2009

(54) REDUCING DRIVING DIRECTIONS

(75) Inventors: David W. Nesbitt, Adamstown, MD (US); G. Duane Gearhart, Hummelstown, PA (US); Michael Dean Swartz, East Prospect, PA (US)

(73) Assignee: MapQuest, Inc., Denver, CO (US)

( * ) Notice: Subject to any disclaimer, the term of this patent is extended or adjusted under 35 U.S.C. 154(b) by 0 days.

(21) Appl. No.: 12/120,448

(22) Filed: May 14, 2008

Related U.S. Application Data

(63) Continuation of application No. 11/019,550, filed on Dec. 23, 2004, now Pat. No. 7,395,153.

(51) Int. Cl.
*G01C 21/34* (2006.01)
*G01C 21/36* (2006.01)

(52) U.S. Cl. ..................... 701/210; 701/211

(58) Field of Classification Search ............... None
See application file for complete search history.

(56) References Cited

U.S. PATENT DOCUMENTS

| | | | |
|---|---|---|---|
| 5,311,173 A | 5/1994 | Komura |
| 5,504,482 A | 4/1996 | Schreder |
| 5,508,930 A | 4/1996 | Smith, Jr. |
| 5,513,110 A | 4/1996 | Fujita |
| 5,515,283 A | 5/1996 | Desai |
| 5,528,501 A | 6/1996 | Hanson |
| 5,684,704 A | 11/1997 | Okazaki |
| 5,752,217 A | 5/1998 | Ishizaki |
| 5,802,492 A | 9/1998 | DeLorme |
| 5,919,245 A | 7/1999 | Nomura |
| 5,938,720 A | 8/1999 | Tamai |
| 5,948,040 A | 9/1999 | DeLorme |
| 6,049,753 A | 4/2000 | Nimura |
| 6,061,626 A | 5/2000 | Meredith |
| 6,085,147 A | 7/2000 | Myers |
| 6,282,489 B1 | 8/2001 | Bellesfield |
| 6,338,021 B1 | 1/2002 | Yagyu |
| 6,349,261 B1 | 2/2002 | Ohnishi |
| 6,351,707 B1 | 2/2002 | Ichikawa |
| 6,356,911 B1 | 3/2002 | Shibuya |
| 6,526,348 B1 | 2/2003 | McDonough |

(Continued)

FOREIGN PATENT DOCUMENTS

WO    WO 00/22593    4/2000

OTHER PUBLICATIONS

"Streets & Tips 2004, Using Streets & Trips"; http://www.microsoft.com/streets/webcomparison/default.asp; 1 page; (Jul. 3, 2004).

(Continued)

*Primary Examiner*—Michael J. Zanelli
(74) *Attorney, Agent, or Firm*—Fish & Richardson P.C.

(57) ABSTRACT

Techniques are provided for reducing the number of maneuvers presented in narrative driving directions for a route from an origin location to a destination location. To do so, driving directions are not provided for maneuvers for areas with which a person is likely to be familiar, such as neighborhood streets near the person's house, office, or another familiar location. A route from a user-specified origin to a user-specified destination is determined. Driving directions are presented only for a portion of the route. The portion of the route for which driving directions are presented may be identified based on an arterial category of roads included in the route.

16 Claims, 9 Drawing Sheets

U.S. PATENT DOCUMENTS

| | | | |
|---|---|---|---|
| 6,577,937 B1 | 6/2003 | Shuman | |
| 6,600,994 B1 | 7/2003 | Polidi | |
| 6,636,805 B1 | 10/2003 | Tada | |
| 6,665,610 B1 | 12/2003 | Correia | |
| 7,065,448 B1 * | 6/2006 | Gearhart | 701/211 |
| 2001/0021895 A1 | 9/2001 | Yamazaki | |
| 2001/0047241 A1 | 11/2001 | Khavakh | |
| 2002/0011941 A1 | 1/2002 | Endo | |
| 2002/0067728 A1 | 6/2002 | Okamoto | |
| 2002/0077745 A1 | 6/2002 | Ohmura | |
| 2002/0128767 A1 * | 9/2002 | Cardno et al. | 701/202 |
| 2003/0069690 A1 | 4/2003 | Correia | |
| 2004/0098194 A1 | 5/2004 | Baur | |
| 2005/0256635 A1 | 11/2005 | Gardner | |

OTHER PUBLICATIONS

"Streets & Tips 2004, Preferences"; http://www.microsoft.com/streets/useit/preferences.asp; 1 page; (Jul. 3, 2004).

"COSMI, Streets Maps USA"; http://www.cosmi.com/html/product%20pages/productivity/street_maps.htm; 1 page; (Jul. 3, 2004).

"Microsoft MapPoint 2004, Fact Sheet, Sep. 2003", pp. 1-6; (Sep. 2003).

MSN.com, printed from http://mappoint.msn.com/(w3a5fq55wwxyvfnn2pz5mfmi)/Home.aspx that is a "Maps & Directions" feature available from http://www.msn.com; admitted prior art published prior to filing date of application.

Yahoo.com, printed from http://maps.yahoo.com that is a "Yahoo! Maps" feature available from http://www.yahoo.com; admitted prior art published prior to filing date of application.

* cited by examiner

REDUCING DRIVING DIRECTIONS

CROSS REFERENCE TO RELATED APPLICATION

This application is a continuation of U.S. application Ser. No. 11/019,550, filed Dec. 23, 2004, titled REDUCING DRIVING DIRECTIONS, now U.S. Pat. No. 7,395,153, which is incorporated herein by reference in its entirety.

TECHNICAL FIELD

This description relates to presenting driving directions for a travel route between an origin location and a destination location.

BACKGROUND

A travel route between an origin location and a destination location may be determined by a computer system, which may be referred to as a mapping system. The mapping system may make this determination by searching for an optimal path through a directed graph (e.g., a collection of nodes and edges) that represents a network of roads and intersections. Each edge (or link) of the graph may represent a road in a map, and each node of the graph may represent an intersection of two or more roads or a terminal point of a road, such as a dead end road. A user of a mapping system may want to see driving directions, which may be in the form of maneuvers in the travel route with a narrative description of each maneuver to be made.

SUMMARY

In one general aspect, driving directions having multiple maneuvers are displayed. Route information is accessed for a route from an origin to a destination. The route includes a first portion that includes one of the origin or the destination. The route information is used to enable presentation on a user system of a set of maneuvers for a second portion of the route that does not include the first portion.

Implementations may include one or more of the following features. For example, only the set of maneuvers for the second portion of the route that does not include the first portion may be generated. The route information may be used to generate a set of maneuvers for the first portion of the route and the second portion of the route, and maneuvers that correspond to the first portion of the route may be eliminated.

The route information for a route may include nodes and links. Each link may represent a road included in the route, and each node may represent an intersection that includes at least one road included in the route.

At least one link or one node included in the first portion of the route may be eliminated from the route information to produce a reduced set of route information. The reduced set of route information may be used to generate the set of maneuvers for only the second portion of the route.

A focus point may be determined for use in identifying the second portion of the route. The focus point may be a link or a node.

A portion of the route from the origin to the focus point may be eliminated. The route information may be used to enable presentation on a user system of a set of maneuvers for a portion of the route from the focus point to the destination.

Alternatively, a portion of the route from the focus point to the destination may be eliminated. The route information may be used to enable presentation on a user system of a set of maneuvers for a portion of the route from the focus point to the destination.

The focus point for identifying the second portion of the route may be determined based on information associated with an identity of the user system. For example, the focus point may be determined based on an address associated with the identity, a user preference associated with the identity, or a predetermined distance set by the identity.

The focus point may be set to be within a predetermined distance from the origin location or the destination location. The predetermined distance may be user-configurable.

The focus point may be determined based on a first occurrence of an arterial category associated with a road in the route. For example, the focus point may be based on a first occurrence of an arterial category associated with a link in the route that is within a user-configurable predetermined distance of the origin location or the destination location.

Presentation on the user system of the route maneuvers may be enabled for only the second portion of the route only after receiving confirmation from a user identity that only the second portion of the route is to be presented.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

Like reference symbols in the various drawings indicate like elements.

DETAILED DESCRIPTION

Techniques are provided for reducing the number of maneuvers presented in narrative driving directions for a route from an origin location to a destination location. To do so, driving directions are not provided for maneuvers for areas with which a person is likely to be familiar, such as neighborhood streets near the person's house, office, or other familiar location. This may help to simplify and make the driving directions provided for a route more meaningful to the person who requested the driving directions. In addition, the techniques may help to present driving directions that more closely approximate the style of person-to-person communication of directions.

Figure 1:
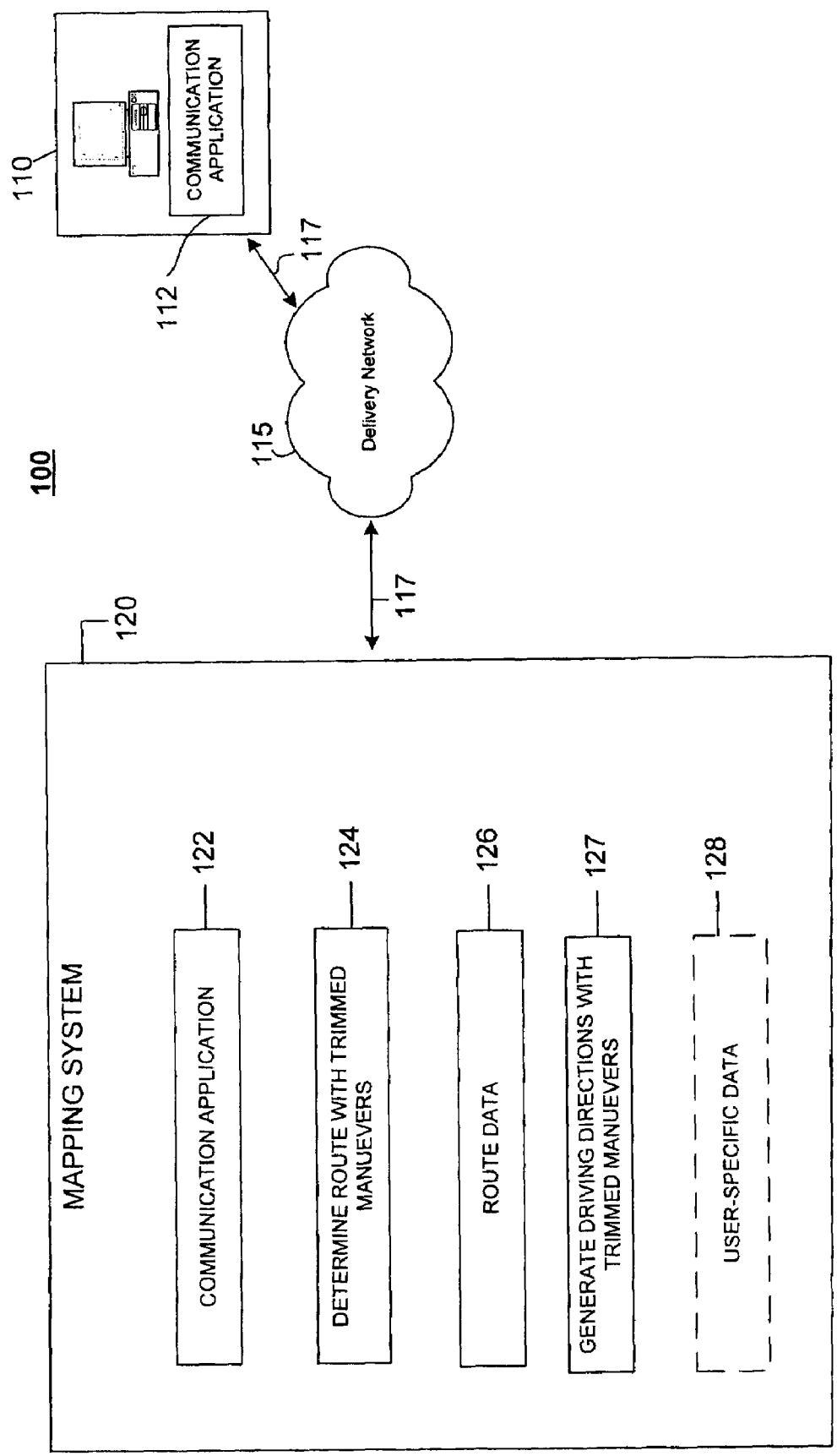
FIG. 1 is a block diagram of a communications system capable of presenting driving directions of a travel route.

Referring to FIG. 1, a communications system 100 is capable of reducing the number of maneuvers presented in narrative driving directions for a route from an origin location to a destination location. More particularly, the communications system 100 is capable of delivering and exchanging messages between a client system 110 and a mapping system 120 through a delivery network 115 to present simplified or reduced driving directions that include only maneuvers for which the user is likely to need driving directions and, as such, to minimize maneuvers presented for a portion of the route known to the user.

Each of the client system 110 and the mapping system 120 may be a general-purpose computer (e.g., a personal computer, a desktop computer, or a laptop computer) capable of responding to and executing instructions in a defined manner. Other examples of the client system 110 and the mapping system 120 include a special-purpose computer, a workstation, a server, a device, a component, other physical or virtual equipment or some combination thereof capable of responding to and executing instructions. The client system 110 also may be a personal digital assistant (PDA), a communications device, such as a mobile telephone, or a mobile device that is a combination of a PDA and communications device.

The client system 110 also includes a communication application 112 and is configured to use the communication application 112 to establish a communication session with the mapping system 120 over the delivery network 115. The communication application 112 may be, for example, a browser or another type of communication application that is capable of accessing the mapping system 120. In another example, the communication application 112 may be a client-side application configured to communicate with the mapping system 120. The client system 110 is configured to send to the mapping system 120 requests for driving directions for a route identified by an origin location and a destination location. The client system 110 also is configured to receive driving directions from the mapping system 120 and to present the received driving directions to a user.

The delivery network 115 provides a direct or indirect communication link between the client system 110 and the mapping system 120, irrespective of physical separation. Examples of a delivery network 115 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 115 includes communication pathways 117 that enable the client system 110 and the mapping system 120 to communicate with the delivery network 115. Each of the communication pathways 117 may include, for example, a wired, wireless, virtual, cable or satellite communications pathway.

The mapping system 120 may receive instructions from, for example, a software application, a program, a piece of code, a device, a computer, a computer system, or a combination thereof, which independently or collectively direct operations, as described herein. The mapping system 120 includes a communications application 122 that is configured to enable the mapping system 120 to communicate with the client system 110 through the delivery network 115.

The mapping system 120 may be a host system, such as an Internet service provider that provides a mapping service to subscribers. In another example, the mapping system 120 may be a system that hosts a web site that provides mapping services to the general public. The mapping system 120 also may be an on-board navigation system that is located in a vehicle and configured to provide driving directions based on the vehicle's current location. In some implementations, an on-board navigation system also may be capable of communicating with another system, such as, for example, communicating with a host system to receive updated navigation data for use in determining a route or real-time routing information (such as information about traffic congestion).

In general, the mapping system 120 is configured to provide driving directions for a route between an origin location and a destination location identified by a user. The origin location and the destination location may be referred to as an origin and a destination, respectively. The mapping system 120 is configured to eliminate maneuvers that are likely to be well known to the user and to present the resulting driving directions only for the other maneuvers in the route.

More particularly, the mapping system 120 includes code segments 124 configured to determine a route, based on a user request, from an origin location to a destination location that eliminates a portion of the route that is likely to be known to the user. To do so, the code segments 124 may be configured to determine a revised origin along a route from the user-specified origin location to the destination location. The revised origin may be, for example, a revised starting node or a revised starting link in a graph representing a network of roads, as described more fully later. In general, the revised origin may reflect the first occurrence of a road of a particular arterial classification or category (collectively, "arterial category"). An arterial category also may be referred to as an arterial level, an artery type, a road classification, or a road category. Generally, though not necessarily, arterial categories may form a hierarchy of arterial levels. Examples of hierarchical arterial categories or levels include an Interstate at the highest level, a United States (U.S.) highway at the second-highest level, a state highway or a state-numbered road at the third-highest level, and a county-numbered road at the fourth-highest level. In such an implementation, it may be useful to identify the revised origin as corresponding to the first occurrence of a road of a particular arterial level or the first occurrence of a road of an arterial level (or levels) that is above the particular arterial level. For example, the revised origin may reflect the first occurrence of an Interstate or may reflect the first occurrence of either a U.S. highway or an Interstate, for example, on the route beginning at the user-specified origin.

The revised origin also may be a particular distance (e.g., five miles) from the user-specified origin. This may be useful, for example, in a case in which the first occurrence of the road with the particular arterial category is located a substantial distance from the user-specified origin such that the user is unlikely to be familiar with how to travel to the first occurrence. In a more particular example, the first occurrence of an Interstate on the route may be located twenty-five, fifty or a hundred miles from the user-specified origin, and the user may not be familiar with how to travel to the Interstate. In such a case, the user may prefer to have the route trimmed based on the first occurrence of a particular arterial category or categories of road (e.g., first occurrence of an Interstate, and first occurrence of either an Interstate or a U.S. highway) only when the first occurrence occurs within a predetermined distance (e.g., five miles) from the user-specified origin.

In any case, the code segments 124 determine a route from a revised origin to the destination location. The route from the revised origin to the destination location may be referred to as a route with trimmed maneuvers, a simplified route, a route with reduced or simplified driving directions, or a route with reduced or simplified maneuvers.

Additionally or alternatively, the code segments 124 may be configured to determine a revised origin prior to the determination of a route from the user-specified origin location to the destination location, and, to determine a route from the revised origin to the destination location. In such a case, the revised origin may be, for example, a particular address or a particular intersection from which a route is generated.

The mapping system 120 also includes a route data store 126 that includes route data corresponding to routes that have been determined from an origin (which may be a revised origin or a user-specified origin) to a destination location. The route data store 126 may be stored in persistent or non-volatile storage, though this need not necessarily be so. For example, route data for a particular route may be stored only in memory, such as random access memory, of the mapping system. In some implementations, the route data 126 may be implemented as a collection of links and/or nodes that represent roads and intersections, respectively. In one example, the route data 126 includes a collection of links that represent a route from an origin to a destination.

The mapping system also includes code segments 127 configured to generate driving directions for a route with reduced maneuvers. The driving directions may be in the form of text, a marked route presented on a map, or a combination of text and a marked route. In some implementations, the driving directions may be oral driving directions that are generated using a text-to-speech process.

In some implementations, the mapping system 120 may include a user-specific data store 128 that stores information related to route-trimming preferences for a particular user. For example, the user-specific data store 128 may include a home address, work address and addresses of other locations (such as a parent's home, a friend's house, a vacation home, or an alternative work location) to indicate an area with which the user is familiar and for which a route with reduced maneuvers is desirable. The user-specific data also may include a predetermined distance from a location to be used to trim maneuvers from the location and/or an indication as to whether a user desires maneuvers to be trimmed.

Figure 2:
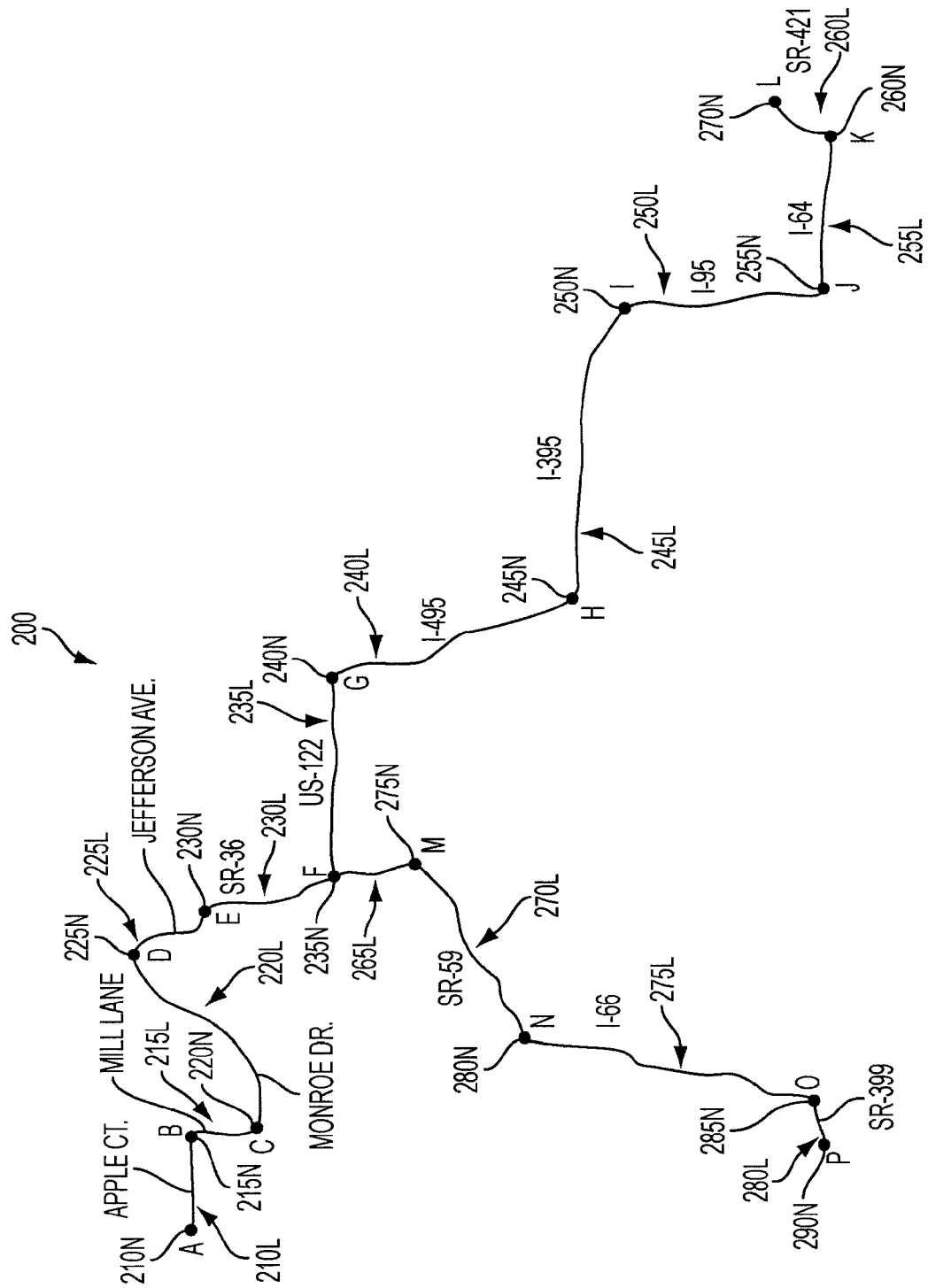
FIG. 2 is a diagram of travel routes for which driving directions that are likely to be well known are not included in the driving directions provided for a travel route.

FIG. 2 illustrates examples of the ways in which maneuvers in a route may be trimmed using a routing graph 200. The routing graph 200 illustrates travel routes for which maneuvers are likely to be well known and are not included in the driving directions provided for a portion of a route on the routing graph 200. The routing graph 200 is illustrated using a collection of links and nodes. A node on the routing graph 200 is represented by a point and is labeled by an uppercase alphabetic character (e.g., A, B, or C). A link on the routing graph 200 is represented by a link that connects two nodes. A link may be referenced using a pair of nodes. For example, the line between node A and node B may be referred to as link AB or as link BA.

The route includes links AB 210L, BC 215L, CD 220L, DE 225L, EF 230L, FG 235L, GH 240L, HI 245L, IJ 250L, JK 255L, KL 260L, FM 265L, MN 270L, NO 275L, and OP 280L. The routing graph 200 also includes nodes A 210N, B 215N, C 220N, D 225N, E 230N, F 235N, G 240N, H 245N, I 250N, J 255N, K 260N, L 270N, M 275N, N 280N, O 285N and P 290N.

In the following examples, the mapping system eliminates maneuvers in a determined route based on various criteria. The criterion used for a particular route may be programmatically determined or may be based on a user preference.

In one example using the routing graph 200, a user of a mapping system requests driving directions for a route from an origin location 210N (i.e., node A) to a destination location 270N (i.e., node L). The mapping system determines a route from origin location 210N to destination location 210N that includes the links 210L, 215L, 220L, 225L, 230L, 235L, 240L, 245L, 250L, 255L and 260L. In this example, the mapping system then determines a revised origin based on the first occurrence of an arterial level of an Interstate in the determined route (i.e., links 210L, 215L, 220L, 225L, 230L, 235L, 240L, 245L, 250L, 255L and 260L). As shown, the link 240L represents an Interstate (i.e., I-495) and is the first occurrence of an Interstate in the route links 210L, 215L, 220L, 225L, 230L, 235L, 240L, 245L, 250L, 255L and 260L. As such, the mapping system identifies the starting node 240N (i.e., node G) of the link 240L or link 240L itself as the revised origin. Based on that determination, the mapping system eliminates links 210L, 215L, 220L, 225L, 230L and 235L, and presents driving directions to the user for maneuvers beginning with the node 240N and including links 240L, 245L, 250L, 255L and 260L.

In a second example, a user of a mapping system requests driving directions for the same route from the origin location 210N (i.e., node A) to the destination location 270N (i.e., node L), and the mapping system determines a revised origin based on the first occurrence of a U.S. highway or an Interstate in the determined route. The link 235L represents a U.S. highway (i.e., US-122)) and is the first occurrence of a U.S. highway or an Interstate in the route links 210L, 215L, 220L, 225L, 230L, 235L, 240L, 245L, 250L, 255L and 260L. As such, the mapping system identifies that link 235L is the first occurrence of a U.S. highway or an Interstate and identifies the starting node 235N (i.e., node F) of the link 235L or the link 235L itself as the revised origin. Based on that determination, the mapping system then eliminates links 210L, 215L, 220L, 225L, and 230L, and presents driving directions to the user for maneuvers beginning with the node 235N and including links 235L, 240L, 245L, 250L, 255L and 260L.

In another example, a user of a mapping system requests driving directions for a route from an origin location 210N (i.e., node A) to a destination location 290N (i.e., node P). The mapping system determines a route from origin location 210N to destination location 290N that includes the links 210L, 215L, 220L, 225L, 230L, 265L, 270L, 275L and 280L. In this example, the mapping system determines the revised origin based on the first occurrence of an Interstate within a distance criterion. More particularly, the distance criterion of 10 miles is used to select the revised origin. The mapping system determines that 275 L is the first occurrence of an Interstate (i.e., I-66) and the link is within 10 miles of the origin location 210N in the determined route. As such, the mapping system determines that the starting node 280N (i.e., node N) of link 275L or the link 275L itself is the revised origin. Based on that determination, the mapping system then eliminates 210L, 215L, 220L, 225L, 230L, 265L and 270L and presents driving directions to the user for maneuvers beginning with the node 280N and including links 275L and 280L.

Figure 3:
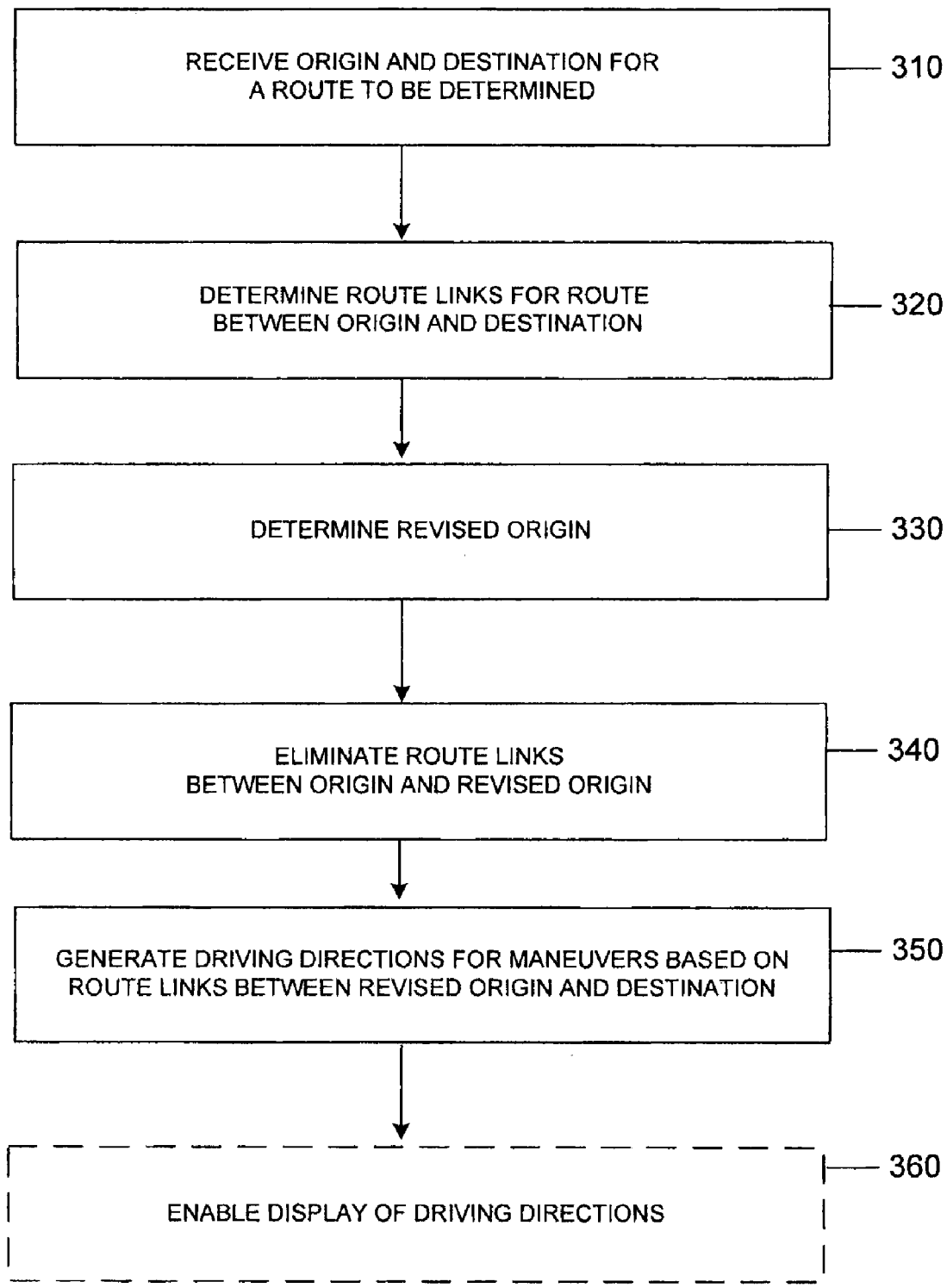
FIGS. 3, 7A and 7B are flow charts of processes that may be used to generate driving directions that do not include maneuvers that are likely to be well known to the person who requested driving directions for a route between an origin location and a destination location.

FIG. 3 illustrates a process 300 for generating driving directions that do not include maneuvers that are likely to be well known to the person who requested driving directions. The process 300 may be performed by a mapping system, such as the mapping system 120 of FIG. 1.

The process begins when the mapping system receives an origin and a destination for a route to be determined (step 310). The received origin may be a link or a node that is associated with an origin location from which the route is to start. Similarly, the received destination may be a link or a node at which the route is to end. When a node is received as an origin, a link that includes the origin node may be identified. In some implementations, the origin and the destination are received based on user input, such as when a user selects a starting location from a list of starting locations, enters an address from which the route is to start, or enters another type of identifier, such as a name of a well-known location, for a starting location. Examples of well-known locations include the White House in Washington, D.C. and the Mall of America in Minneapolis, Minn. Alternatively or additionally, the origin may be determined based on the geographical position of a vehicle or a mobile device (such as a mobile telephone or a portable navigation system).

The mapping system determines route links for a route between the origin and the destination (step 320). This may be accomplished, for example, using route determination techniques to progressively search a network graph beginning from an origin until the destination is reached. In one example, the mapping system may use the Dijkstra or A* method to determine an optimal route based on the distance and/or time required to travel between the origin and the destination.

The mapping system determines a revised origin (step 330). The revised origin may be a node or a link in the network graph used to determine the route. A revised origin may be determined, for example, based on one or more of various criteria. In one example, a revised origin may be identified by identifying the first occurrence of a road of a particular arterial category or the first occurrence of a road of one of multiple arterial categories. For example, the revised origin may be identified by identifying the first occurrence of a major highway, such as an Interstate and/or a U.S. highway. A revised origin may be determined based on an arterial category that is specified or is inferred based on another arterial category. In the example of a hierarchical arterial classification system in which a lower hierarchical level necessarily includes each of the higher hierarchical levels, the revised origin may be identified based on an arterial level identified as the second-highest arterial level (here, U.S. highway). As such, the second-highest arterial level (here, U.S. highway) necessarily includes the highest arterial level (here, Interstate). In another example, the revised origin may be identified based on multiple arterial categories that are specified (e.g., both an Interstate arterial category and a U.S. highway arterial category are specified). In another example, a revised origin may be identified based on the occurrence of a road of a particular arterial category (or a road of one of multiple arterial categories) within a particular distance ("distance criteria") of the origin. In some implementations, the revised origin (e.g., a revised starting node or a revised starting link) identifies a particular intersection related to the first occurrence of a particular arterial category. For example, when a revised origin identifies the first occurrence of a particular Interstate, the revised origin may be identified as the entrance ramp to the particular Interstate along the route (as opposed to, for example, a link along the Interstate other than at the entrance ramp identified in the route). This may help to provide certainty as to the revised origin in relation to other parts of the route. For example, when the driving directions start at a particular intersection (e.g., an entrance ramp to a particular Interstate), driving distance information between the first maneuver may be provided (e.g., proceed on the particular Interstate for n miles).

The mapping system eliminates route links that are between the origin and the revised origin (step 340) and generates text for maneuvers that correspond to the route links that are between the revised origin and the destination (step 350). Driving direction text may be generated by using text that corresponds to a type of maneuver that is used between two adjacent links in the route and identifying the name of the road associated with the second of the adjacent links. Examples of driving direction text include "merge onto I-495" and "turn right onto Beauregard Ave." Finally, the mapping system optionally enables the display of the reduced driving directions (step 360). For example, driving directions may be provided to a client system, such as the client system 110 of FIG. 1, for display. The driving directions also may be printed on a printer associated with a client system, or may be displayed on a display associated with an on-board vehicle navigation system or a mobile telephone.

In this or other implementations, a mapping system may receive route information for a route that has been determined in lieu of receiving an origin and a destination (step 310) and determining a route between the origin and the destination (step 320). For example, a mapping system may receive a list of links or nodes for a particular route.

Figure 4:
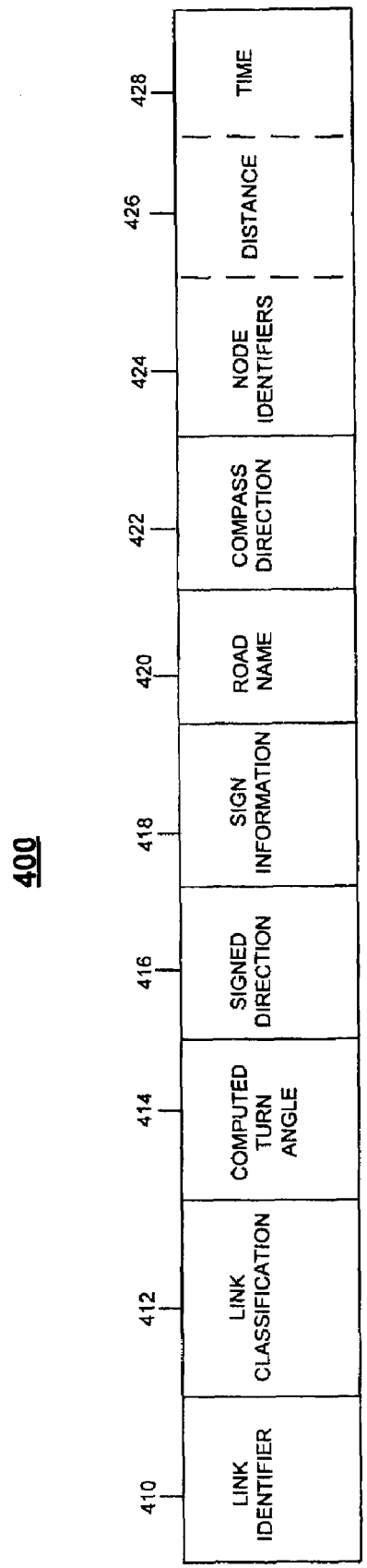
FIG. 4 is a block diagram depicting example data structures used to display link information for a route for which driving directions are presented.

FIG. 4 shows an example of a data structure 400 used to display link information for a route for which driving directions are presented. The data structure 400 may be used, for example, to provide route information to a process to reduce driving directions based on the likelihood that the same maneuvers are known to the user of the driving directions. The link data structure 400 includes a link identifier 410, a link classification 412, a computed turn angle 414, a signed direction 416, sign information 418, a road name 420, a compass direction 422, node identifiers 424, an optional distance 426 and an optional time 428.

The link identifier 410 uniquely identifies a particular link to which the link information applies. The link classification 412 identifies the arterial category that corresponds to the link, as described previously. The computed turn angle 414 indicates the degree of angle involved in a turn from the link to another link in the route. The computed turn angle 420, for example, may be one of a sharp left, a sharp right, a slight left, a slight right, a merge, or straight.

The signed direction 416 indicates the travel direction of the road that corresponds to the link as indicated by posted signs along the road. A signed direction typically is one of north, south, east or west. Additionally or alternatively, the signed direction 416 may be stored in association with the road name (such as being stored as a suffix to the road name).

The sign information 418 indicates information about one or more exit signs that applies to the link. The road name 420 indicates the name of the road that corresponds to the link. Together, the link classification 412, the signed direction 416 and the road name 420 identify a particular road. For example, the particular road name "I-235 South" is identified using a link classification 412 of "Interstate," a signed direction 416 of "South" and a road name 420 of "235."

The compass direction 422 identifies the general direction of travel of a vehicle on a road that corresponds to the link. The compass direction 422 may be the same, or different from, the signed direction 416 of the link.

The node identifiers 424 includes identifiers for one or more nodes that are associated with the link. For example, the node identifiers 424 may include an end node identifier that uniquely identifies the particular node that is the end node of a link having a particular direction (i.e., a directed link) or a start node identifier that uniquely identifies a particular node that is the starting node of a directed link. The ability to traverse between node information that identifies links associated with a node and link information may be useful in determining a route or generating driving directions for a route. For example, a mapping system may identify a link that is adjacent to a particular node, then identify the end node of the link, then identify another link that proceeds from the end node, and so on.

The optional distance 426 indicates the distance to traverse the link, and the optional time 428 identifies an average time for traversing the link.

Figure 5A:
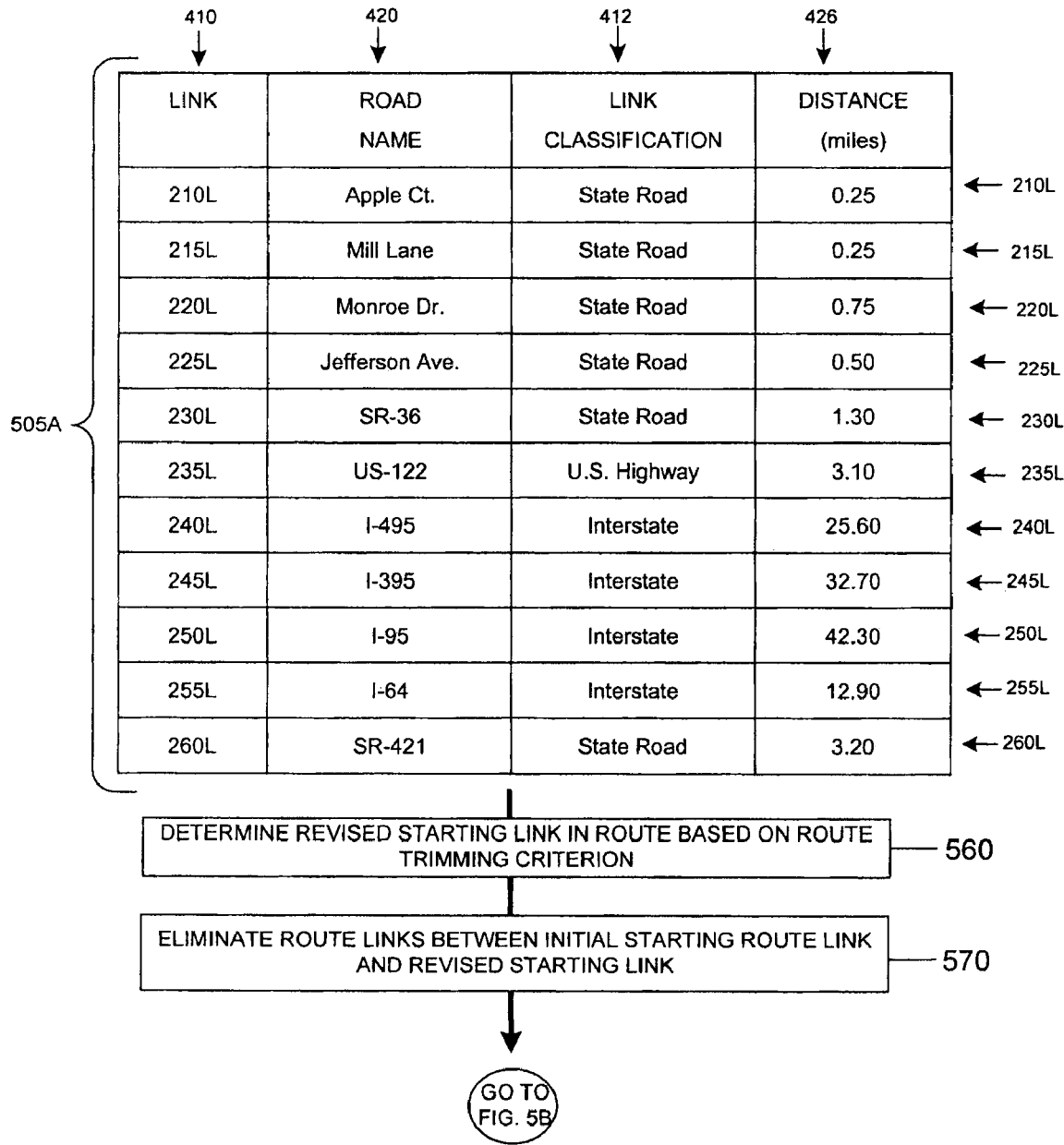
FIGS. 5A and 5B are diagrams that illustrate a process for presenting reduced driving directions.
Figure 5B:
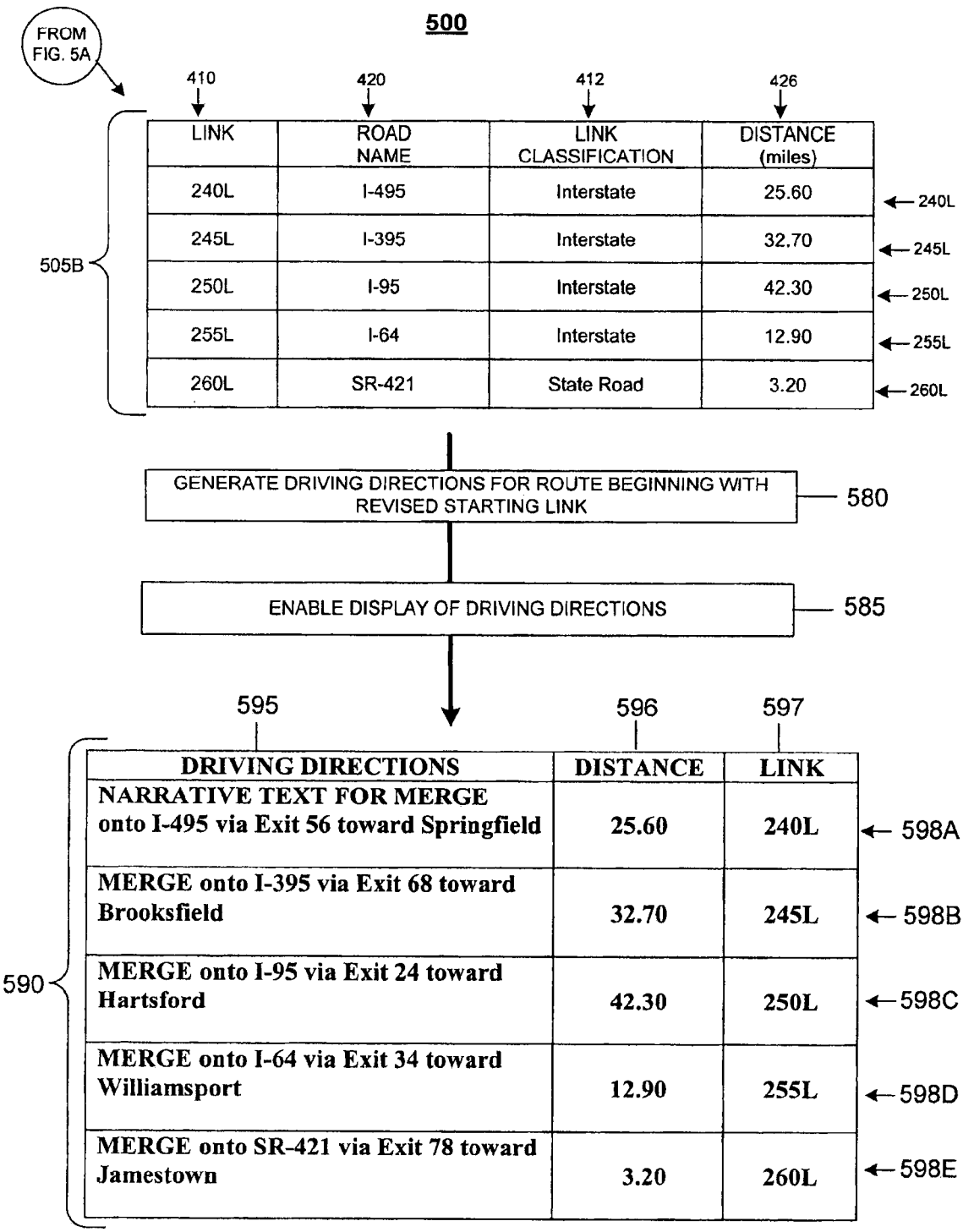

FIGS. 5A and 5B illustrate an example 500 of eliminating links in a route to reduce maneuvers presented in driving directions for the route. For convenience, the routing graph 200 of FIG. 2 is used in the example 500. The mapping system receives route information 505A of a route from the origin 210N (i.e., a node A) to a destination 270N (i.e., node L) of FIG. 2. The route information 505A includes the route links 210L, 215L, 220L, 225L, 230L, 235L, 240L, 245L, 250L, 255L and 260L, and, for each link, a portion of link information as described previously with respect to the link data structure 400 of FIG. 4. As shown, the route information 505A includes a link identifier 410, a road name 420, a link classification 412 and a distance 426 for each of the links 210L, 215L, 220L, 225L, 230L, 235L, 240L, 245L, 250L, 255L and 260L. For example, link information for link 210L indicates a road name of "Apple Ct.," is classified as a "State Road," and has a length of 0.25 miles.

To reduce the maneuvers included in driving directions for the route links in the example 500, the mapping system eliminates links in the route information 505A based on the first occurrence of an Interstate, as described previously with respect to FIG. 2. More particularly, the mapping system identifies a revised starting link for the route based on a route trimming criterion (i.e., the first occurrence of an Interstate) (step 560). The link classification 412 is used to identify each link that represents an Interstate in the route. Here, each of the links 240L, 245L, 250L and 255L represents an Interstate. The mapping system identifies the link 240L (i.e., I-495) as the first occurrence of an Interstate in the route, and the mapping system uses the link 240L as the revised starting link of the route. Based on that determination, the mapping system eliminates route links between the initial starting route link and the revised starting route link (step 570).

Referring also to FIG. 5B, the mapping system produces reduced route information by eliminating the links 210L, 215L, 220L, 225L, 230L and 235L that are between the initial starting route link (i.e., 210L) and the revised starting route link (i.e., 240L). As a result, reduced route information 505B includes only the route links 240L to 260L.

The mapping system generates driving directions 590 for maneuvers based on reduced route information 505B having route links 240L to 260L (step 580) and enables the display of the driving directions (step 585). The generated driving directions 590 include narrative text 595 and a distance 596 for each of maneuvers 598A-598E that correspond to links 240L to 260L, respectively, included in the route. For descriptive convenience, the driving directions 590 also identify links 597 that correspond to driving maneuvers 598A-598E included in the narrative text 595. The driving directions 590 begin with a driving maneuver 598A that is based on the revised starting link 240L.

As shown in the example 500, the narrative text for driving directions for the route begins with merging onto an Interstate near the initial origin of the route rather than beginning with directions that correspond to the initial starting link 210L. The driving directions in the example 500 illustrate reducing driving directions by trimming maneuvers that are well known to the user of the driving directions.

Figure 6:
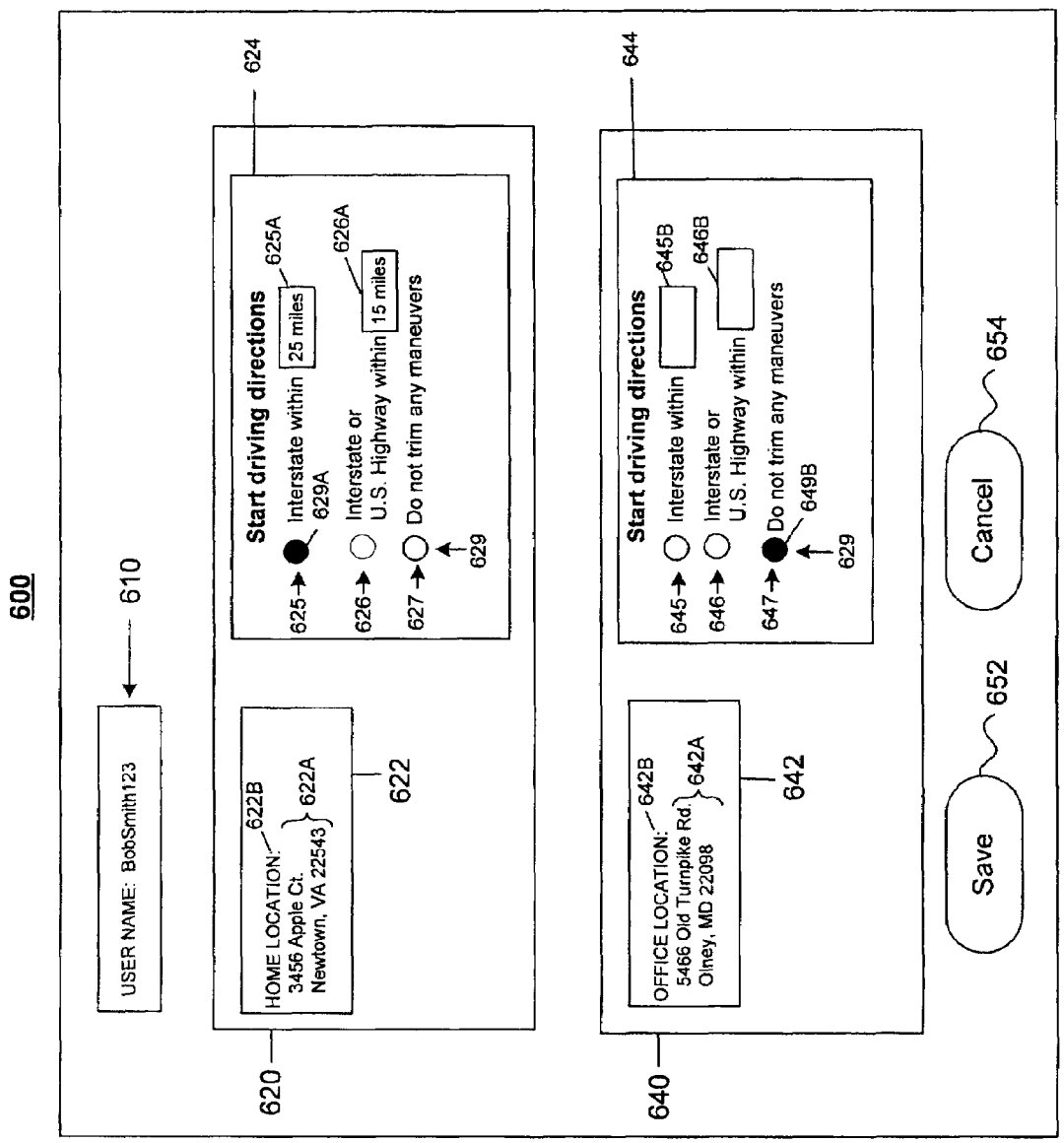
FIG. 6 is an illustration of an exemplary interface for setting preferences, for a user account, to control presentation of driving directions.

FIG. 6 depicts an exemplary graphical user interface 600 for a communications system capable of enabling a user to configure preferences for trimming maneuvers from driving directions for routes requested by the user from particular origins.

The user interface 600 includes an account identification window 610 that identifies the user account for which trimming preferences identified in the user interface 600 are to be applied when a route is requested from an origin that is identified in the user interface 600. The user interface 600 also includes windows 620 and 640 that each identify an origin location in a location window 622 or 642, respectively. When a user associated with the user account 610 requests a route from an origin identified in the location window 622 or 642, the preferences identified in a preference window 624 or 644, respectively, are applied to reduce maneuvers in the driving directions provided for the requested route.

In the example of the user interface 600, the location window 622 identifies a home address 622A, as noted by the location type indicator 622B. A preference window 624 is associated with the location window 622 and identifies a preference to be applied to a route that originates from the home address 622A. The preference window 624 presents maneuver trimming options 625, 626, and 627 that are selectable using controls 629. As shown, the control 629A is selected such that option 625 is to be applied when a route is requested from the home address 622A by a user associated with the user account identified in the account identification window 610. As shown, an option 625 indicates that driving directions are to start with an Interstate that occurs within a predetermined distance of the home address 622A, where the predetermined distance is specified in field 625A. In some implementations, the first occurrence of an Interstate may be used, whereas other implementations may use the last occurrence of an Interstate within the predetermined distance 625A (here, 25 miles). Also as shown, option 626 indicates that driving directions are to start with an Interstate or a U.S. highway that occurs within a predetermined distance of the home address 622A where the predetermined distance is specified in field 626A. Option 627 represents a preference that driving directions are presented from the home location 622A and are not trimmed. Option 627 may be used, for example, in an implementation where a mapping system applies a maneuver trimming option unless a user account is associated with a different maneuver trimming option. For example, a mapping system may by default trim maneuvers based on a first occurrence of an Interstate unless a user account is associated with another preference.

Similarly, the location window 640 identifies an office address 642A where a user associated with the identified user account 610 works or travels frequently, as shown by the location type indicator 642B. The preference window 644 is associated with the location window 640 and identifies options 645-647 that are selectable through controls 649 and correspond to options 625-627. The same options are presented in both of the preference windows 624 and 644, though this need not necessarily be so. For example, a mapping system may present the options based on whether an address associated with options is rural, suburban or urban in nature. As shown in the preference window 644, predetermined distance criteria 645B and 646B are not associated with the options 645 and 646, respectively. In this example, the control 649B is selected such that the option 648 representing a preference not to trim any maneuvers is to be applied when a route is requested from the work address 642A by a user associated with the user account identified in the account identification window 610.

The user interface 600 also includes a save control 652 to persistently store the maneuver trimming options in electronic storage and remove the interface 600 from display, and a cancel control 654 to remove the interface 600 from display without saving newly entered maneuver trimming options.

In this or other implementations, the mapping system may check to determine whether the selected preference is applicable to an identified origin location and prohibit an inappropriate or unusable preference from being associated with the user account. To illustrate using the preference 629A identified in preference window 624, the mapping system may prohibit the user from saving the preference 629A if the mapping system determines that no Interstate is found within 25 miles of the home address 622A. Additionally or alternatively, the mapping system may display a message indicating that the preference is inappropriate or unusable and suggest an alternative preference (such as a distance criteria that reflects an occurrence of an Interstate relative to the home address 622A).

Alternatively or additionally, one or more preferences may be associated with a user account without necessarily being associated with a particular address. For example, a user may associate a preference to start driving directions at the first occurrence of an Interstate in a route regardless of the route origin. A user may be permitted to override a default preference, for example, by indicating a preference to be applied to a particular route request that may be entered through a routing user interface used to identify a origin and a destination for a route.

Figure 7A:
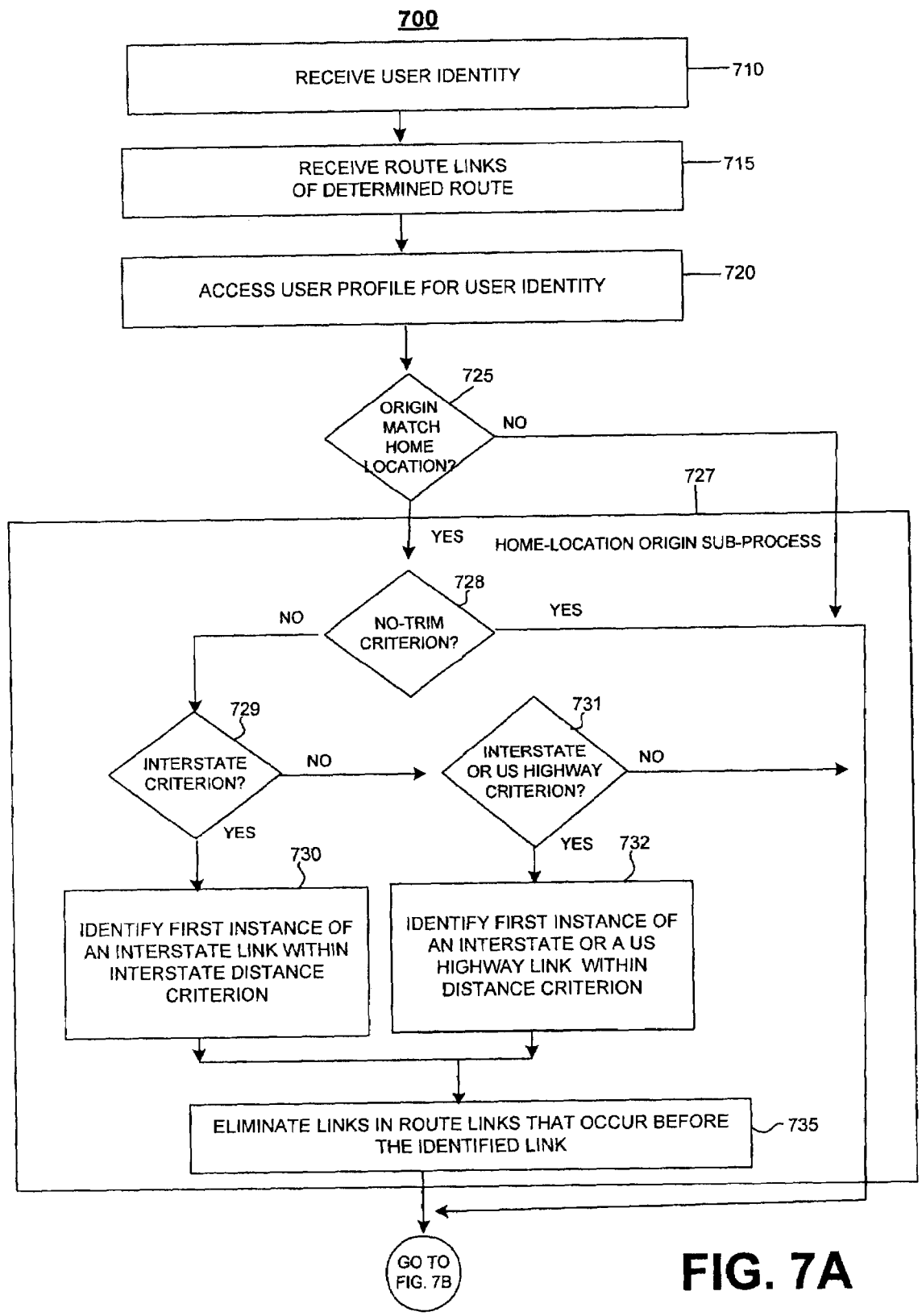
Figure 7B:
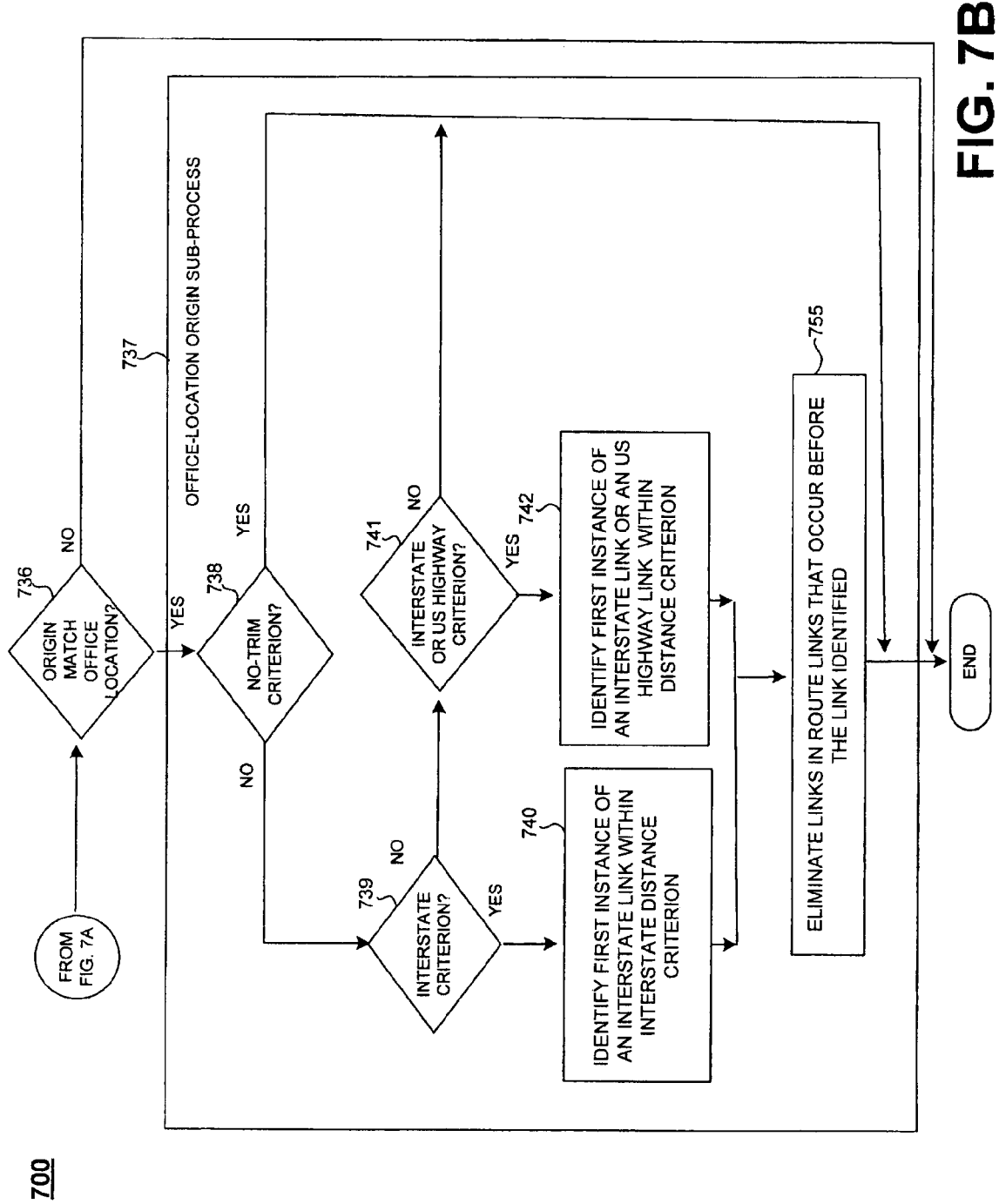

FIGS. 7A and 7B illustrate a process 700 for eliminating, based on user preferences, links of a route to reduce maneuvers presented in driving directions for the route. The process 700 may be performed by a mapping system, such as the mapping system 120 of FIG. 1. In general, the mapping system determines if the route begins with a particular origin that is associated with a trimming preference of a user account of the user who is requesting the route, and, if so, the mapping system applies a route trimming preference that is predetermined in the user account for that particular origin.

In the process 700, the mapping system receives a user identity (step 710) and route links of a determined route (step 715). The user identity may be an identifier of a user account through which the user signs into the mapping system or a user account of another system through which the user accesses the mapping system. The mapping system accesses a user profile associated with the received user identity to determine whether there is a route trimming option that can be applied to the current route (step 720). As illustrated in FIG. 6, a user profile may include information identifying the user's home and/or office location and the route trimming preference associated with each location.

The mapping system determines whether the received links begin at the user's home location as indicated in the trimming preference of the accessed user profile (step 725). If so, the mapping system starts the home-location origin sub-process 727. Otherwise, the mapping system determines whether the received links begin at the user's office location as indicated in the trimming preference of the accessed user profile (step 736).

In the home-location origin sub-process 727, the mapping system determines whether the trimming preference indicates that a route from a home location should not be trimmed (step 728), and, if so, ends the sub-process 727, which results in no maneuvers being trimmed from the route.

When a trimming option is indicated in the user preference (e.g., a no-trim option is not selected), the mapping system checks and applies each of the other possible criteria (steps 729-732) and eliminates links in the received route links based on the application of the criterion (step 735).

More particularly, the mapping system determines whether an Interstate criterion is to be applied (step 729), and, if so, the mapping system identifies the first instance of an Interstate link within an Interstate distance criterion from the home location to use as a revised origin link (step 730). An example of a preference for an Interstate criterion is option 626 of FIG. 6. When the user preference indicates that an Interstate criterion or a U.S. highway criterion is to be applied (step 731), the mapping system identifies the first instance of an Interstate link or a U.S. highway link that occurs within the predetermined distance criterion from the home location to use as a revised origin link (step 732). An example of a preference for applying an Interstate or a U.S. highway criterion is option 627 of FIG. 6. The predetermined distance criterion may be the same as, or different from, the Interstate distance criterion used in step 740. The mapping system eliminates links that occur before the identified revised origin link (step 735).

Referring also to FIG. 7B, the mapping system determines whether the received links begin at the user's office location specified in the user's trimming preference (step 736) If so, the mapping system starts a office-location origin sub-process 737; otherwise, the process 700 ends.

As with the name location, the mapping system determines whether a no-trim criterion is selected (step 738), and, if so, ends the process 700, which results in no maneuvers being trimmed from the route.

When a trimming option is indicated in the user preference (e.g., a no-trim criterion is not selected), the mapping system checks and applies each of the other possible criteria (steps 739-742) and eliminates links in the received route links based on the application of the criterion (step 755). More particularly, the mapping system determines whether the user preference indicates that an Interstate criterion is to be applied (step 739), and, if so, the mapping system identifies the first instance of an Interstate link within the interstate distance criteria from the office location to use as a revised origin (step 740). When the user preference indicates that an Interstate criterion or a U.S. highway criterion is to be applied (step 741), the mapping system identifies the first instance of an Interstate link or a U.S. highway link that occurs within the predetermined distance criterion of the office location to use as a revised origin link (step 742). When the user preference indicates that the route is to start at a particular intersection (step 743), the mapping system identifies a link that proceeds from the identified intersection as a revised origin link (step 744). The mapping system eliminates links that occur before the identified revised origin link (step 755) and ends the process 700.

Although FIGS. 1-7 illustrate systems and methods for displaying driving directions in which route maneuvers are reduced into a smaller number of driving direction maneuvers using a mapping system, the techniques may be applicable, for example, to one or more computing devices for displaying driving directions that communicate in a client system and host system (e.g., an Internet access provider or an Internet service provider) relationship, a single computing device (e.g., with or without networking capabilities), or an embedded system (e.g., a navigation routing system in an automobile or other vehicle).

The techniques and concepts describe processing link information to generate maneuver information and processing the generated maneuver information to generate reduced driving directions. The described techniques and concepts are not limited to being performed only on link information or maneuver information. The techniques described as being performed on link information also may be performed on maneuver information, and the techniques described as being performed on maneuver information also may be performed on link information.

The techniques and concepts generally describe eliminating an initial portion of a route that includes an origin and presenting driving directions only for the remaining portion of the route. The techniques and concepts also may be applicable to identify and eliminate a portion of a route that does not necessarily include an origin. For example, when a user requests directions from an origin to a destination that is well known to the user (such as the user's home or office location), driving directions may be generated and presented for a route from the origin to a point along the determined route that occurs before the user's home or office location. The point may be referred to as a revised destination point or a focus point. Similarly, a revised origin point from which driving directions are presented may be referred to as a focus point.

The techniques and concepts generally describe displaying driving directions in which the hierarchy of arterial levels are identified using a hierarchy used in the United States (e.g., the highest arterial category is an Interstate, and the second highest arterial category is a U.S. highway). The techniques and concepts are generally applicable to other examples of arterial levels that occur outside of the United States. In one example, in the United Kingdom (U.K.), the highest arterial level is a Motorway (that may be identified by a M number), the second-highest arterial level is an A-road (that may be identified by an A number), and the third-highest arterial level is a B-road (that may be identified by a B number). In Spain, for example, the highest arterial level is a European road (that may be identified by an E number), the second-highest arterial level is a Autopista (that may be identified by an A number), the third-highest arterial level is a Carratera Nacional (that may be identified by a N number), and the fourth-highest arterial level is a Carratera Comarcal (that may be identified by a C number). In Italy, for example, the highest arterial level is a European road (that may be identified by an E number), the second-highest arterial level is an Autostrada (that may be identified by an A number), the third-highest arterial level is a Strada Statale (that may be identified by a SS number), and the fourth-highest arterial level is a Strada Provinciale (that may be identified by a SP number). The technique of trimming driving directions based on the occurrence of a road of a particular arterial category may be applicable to any hierarchy of arterial levels.

The described techniques and concepts include eliminating a portion of a determined route and generating driving directions for only less-than-all the determined route from the initial origin to the destination. In some implementations, driving directions may be generated for all maneuvers in the route from the initial origin to the destination, but only a subset of the maneuvers may be presented. This may help to eliminate maneuvers that are well-known to a user and, in doing so, may reduce the number of maneuvers included in driving directions for a route.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-readable medium having embodied thereon a computer program that generates a graphical user interface on a display device for using a computer to identify personal preferences for reducing maneuvers in driving directions, the computer program comprising executable instructions that, when executed, are configured to generate a graphical user interface, the graphical user interface comprising:

an origin display configured to enable a user to identify an origin location;

a preference display configured to enable the user to identify a preference for reducing maneuvers in driving directions originating at or near the origin location; and a control configured to persistently store the preference to be applied when the user requests driving directions for a route that originates at or near the origin location.

2. The computer-readable medium of claim 1 wherein the preference display is configured to enable the user to identify a preference for a route that originates at or near the origin location, the preference indicating that the driving directions are to start at a first occurrence of a maneuver involving an Interstate in the driving directions.

3. The computer-readable medium of claim 1 wherein the preference display is configured to enable the user to identify a preference for a route that originates at or near the origin location, the preference indicating that the driving directions are to start at a first occurrence of a maneuver involving an Interstate or a U.S. Highway in the driving directions.

4. The computer-readable medium of claim 1 wherein:
the preference display is configured to enable the user to identify a preference for a route that originates at or near the origin location,
the preference indicating that the driving directions are to start at a first occurrence of a maneuver involving an Interstate in the driving directions, and
the maneuver involving the Interstate occurs within a user-identified predetermined distance from the origin location identified in the origin display.

5. The computer-readable medium of claim 1 wherein:
the preference display is configured to enable the user to identify a preference for a route that originates at or near the origin location,
the preference indicating that the driving directions are to start at a first occurrence of a maneuver involving an Interstate or a U.S. Highway in the driving directions, and
the maneuver involving the Interstate or the U.S. Highway occurs within a user-identified predetermined distance from the origin location identified in the origin display.

6. The computer-readable medium of claim 1 wherein the identified origin location corresponds to a location identified as a home location and associated with the user.

7. The computer-readable medium of claim 1 wherein the identified origin location corresponds to a location identified as an office location and associated with the user.

8. The computer-readable medium of claim 1 wherein the identified origin location is selected from multiple locations associated with the user.

9. A system for generating a graphical user interface on a display device for using a computer to identify personal preferences for reducing maneuvers in driving directions, the system comprising a computer and a computer and executable instructions that, when executed, are configured to generate a graphical user interface, the graphical user interface comprising:
an origin display configured to enable a user to identify an origin location;
a preference display configured to enable the user to identify a preference for reducing maneuvers in driving directions originating at or near the origin location; and
a control configured to persistently store the preference to be applied when the user requests driving directions for a route that originates at or near the origin location.

10. The system of claim 9 wherein the preference display is configured to enable the user to identify a preference for a route that originates at or near the origin location, the preference indicating that the driving directions are to start at a first occurrence of a maneuver involving an Interstate in the driving directions.

11. The system of claim 9 wherein the preference display is configured to enable the user to identify a preference for a route that originates at or near the origin location, the preference indicating that the driving directions are to start at a first occurrence of a maneuver involving an Interstate or a U.S. Highway in the driving directions.

12. The system of claim 9 wherein:
the preference display is configured to enable the user to identify a preference for a route that originates at or near the origin location,
the preference indicating that the driving directions are to start at a first occurrence of a maneuver involving an Interstate in the driving directions, and
the maneuver involving the Interstate occurs within a user-identified predetermined distance from the origin location identified in the origin display.

13. The system of claim 9 wherein:
the preference display is configured to enable the user to identify a preference for a route that originates at or near the origin location,
the preference indicating that the driving directions are to start at a first occurrence of a maneuver involving an Interstate or a U.S. Highway in the driving directions, and
the maneuver involving the Interstate or the U.S. Highway occurs within a user-identified predetermined distance from the origin location identified in the origin display.

14. The system of claim 9 wherein the identified origin location corresponds to a location identified as a home location and associated with the user.

15. The system of claim 9 wherein the identified origin location corresponds to a location identified as an office location and associated with the user.

16. The system of claim 9 wherein the identified origin location is selected from multiple locations associated with the user.

* * * * *